United States Patent
Han et al.

(10) Patent No.: US 12,326,517 B2
(45) Date of Patent: Jun. 10, 2025

(54) LIGHT REFLECTION DEVICE AND LiDAR SCANNING SYSTEM HAVING THE SAME

(71) Applicant: HL KLEMOVE CORP., Incheon (KR)

(72) Inventors: HakGu Han, Namyangju-si (KR); Seong Hee Jeong, Yongin-si (KR); Yun Ki Han, Suwon-si (KR); HoSeok Shin, Suwon-si (KR); Chulseung Lee, Pyeongtaek-si (KR)

(73) Assignee: HL KLEMOVE CORP., Incheon (KR)

( * ) Notice: Subject to any disclaimer, the term of this patent is extended or adjusted under 35 U.S.C. 154(b) by 1158 days.

(21) Appl. No.: 17/173,191

(22) Filed: Feb. 10, 2021

(65) Prior Publication Data

US 2021/0247492 A1 Aug. 12, 2021

(30) Foreign Application Priority Data

Feb. 11, 2020 (KR) .................. 10-2020-0016275

(51) Int. Cl.
*G01S 7/481* (2006.01)
*G02B 26/08* (2006.01)

(52) U.S. Cl.
CPC ........ *G01S 7/4812* (2013.01); *G02B 26/0816* (2013.01)

(58) Field of Classification Search
CPC .... G01S 7/4812; G01S 7/4811; G01S 7/4817; G02B 26/0816; G02B 26/123
USPC ...................................................... 356/4.01
See application file for complete search history.

(56) References Cited

FOREIGN PATENT DOCUMENTS

| JP | 2000-145694 A | 5/2000 |
| JP | 2001-51225 A | 2/2001 |
| JP | 2009-138473 A | 6/2009 |
| KR | 20-1999-0010470 A | 3/1999 |
| KR | 10-1674062 B1 | 11/2016 |
| KR | 10-2019-0141345 A | 12/2019 |

OTHER PUBLICATIONS

English translation of WO 2017/082540 description corresponding to KR 101674062, created 2024, 52 pages. (Year: 2024).*
English translation of WO 2017/082540 claims corresponding to KR 101674062, created 2024, 11 pages (Year: 2024).*
KR 101674062 abstract, created 2024, 1 page (Year: 2024).*
Korean Office Action dated Mar. 21, 2024 for corresponding Korean Patent Application No. 10-2020-0016275, with English machine translation (17 pages).

* cited by examiner

*Primary Examiner* — Daniel L Murphy
(74) *Attorney, Agent, or Firm* — Hauptman Ham, LLP

(57) ABSTRACT

A light reflection device is disclosed. The light reflection device according to an exemplary embodiment of the present disclosure includes a first reflector configured to reflect an optical signal emitted from a light output unit to an object, a second reflector configured to reflect the optical signal reflected from the object to a light receiving unit, a blocking plate interposed between the first reflector and the second reflector, a motor configured to rotate at least one of the first reflector, the second reflector, and the blocking plate, and a coupling part configured to couple the first reflector, the second reflector, and the blocking plate so that the first reflector, the second reflector, and the blocking plate rotate at the same angle on the basis of a rotation axis.

19 Claims, 13 Drawing Sheets

80 : 81, 82, 83, 84, 85, 86

LIGHT REFLECTION DEVICE AND LiDAR SCANNING SYSTEM HAVING THE SAME

CROSS-REFERENCE TO RELATED APPLICATION

This application claims priority to and the benefit of Korean Patent Application No. 2020-0016275, filed on Feb. 11, 2020, the disclosure of which is incorporated herein by reference in its entirety.

BACKGROUND

1. Field of the Invention

The present disclosure relates to a light reflection device and a light detection and ranging (LiDAR) scanning system including the same, and more specifically, to a light reflection device provided with a rotating reflective surface and a LiDAR scanning system including the same.

2. Discussion of Related Art

Electronic devices for collecting spatial information of a specific region have been developed Among the above, the development of electronic devices which are referred to as optical scanners, laser scanners, and the like, and detect a distance of an object and the like using laser light is increasing.

Electronic devices using laser light are used in various fields such as automobiles, mobile robots, ships, security systems, assembly lines, unmanned aerial vehicles, drones, and the like, and application fields thereof also have been expanded to various fields. Specifically, research and demand for a light reflection device of a light detection and ranging (LiDAR) scanner are increasing rapidly in relation to autonomous driving of automobiles, which is in the spotlight in recent years.

Meanwhile, the driving principle of the electronic device using this laser light is as follows. First, the laser light is periodically scanned toward a scanning region by a light deflection device. Further, the laser light returned by an object to be detected is sensed by a sensor and evaluated by a controller. In this case, an angular position of the object to be detected is determined based on angular position information of the light deflection device. Further, distance information of the object to be detected is determined by the controller based on time of flight (TOF).

Like the above, in order to accurately interpret spatial information by detecting light, a device of a very precise level is required to minimize the occurrence of errors. Accordingly, an electronic device using laser light requires a configuration capable of minimizing noise in a light reflection process. Further, the electronic device is required to be formed in a structure capable of maintaining a high level of precision even when the device itself moves. In addition, the electronic device should be formed in a structure that is advantageous for manufacturing while capable of obtaining the above effects.

Japanese Laid-Open Patent Application 2001-051225A (Published on Feb. 23, 2001)

SUMMARY OF THE INVENTION

The present disclosure is directed to providing a light reflection device including a blocking plate capable of preventing interference by an optical signal, and not having a concern about damage to a reflective surface when installed, and a light detection and ranging (LiDAR) scanning system including the same.

The present disclosure is directed to providing a light reflection device capable of preventing angular errors between a plurality of reflectors and a LiDAR scanning system including the same.

The present disclosure is directed to providing a light reflection device capable of achieving manufacturing process efficiency and a LiDAR scanning system including the same.

According to an aspect of the present disclosure, there is provided a light reflection device including: a first reflector configured to reflect an optical signal emitted from a light output unit to an object; a second reflector configured to reflect the optical signal reflected from the object to a light receiving unit; a blocking plate interposed between the first reflector and the second reflector; a motor configured to rotate at least one of the first reflector, the second reflector, and the blocking plate; and a coupling part configured to couple the first reflector, the second reflector, and the blocking plate so that the first reflector, the second reflector, and the blocking plate rotate at the same angle on the basis of a rotation axis, wherein the first reflector is located on a first surface of the blocking plate, and the second reflector is located on a second surface of the blocking plate.

At least one of the first reflector and the second reflector may be formed in a polyhedral shape, and may be formed with a recessed region recessed in a direction from one surface to the rotation axis.

The first reflector and the second reflector may be formed in the same shape.

The blocking plate may be formed in a disk shape.

The motor may include a shaft passing through the first reflector, the second reflector, and the blocking plate, and a first nut coupled to the shaft.

The shaft may have a D-cut portion formed in at least a portion thereof.

The motor may be connected to a reflective surface of the first reflector or the second reflector to rotate the first reflector or the second reflector.

The motor may be an outer rotor-type motor.

A protruding portion may be formed on at least a portion, adjacent to the reflective surface of the first reflector or the second reflector, of a housing of the motor.

A sensor configured to sense rotation may be installed in the protruding portion.

The portion of the housing and the reflective surface of the first reflector or the second reflector may be coupled to each other using a first bolt.

The coupling part may include a second bolt passing through the first reflector, the second reflector, and the blocking plate, and a second nut coupled to the second bolt.

The second bolt may have a D-cut portion formed in at least a portion thereof.

The coupling part may include pin members forcibly fit-coupled to a through hole passing through the first reflector, the second reflector, and the blocking plate.

The blocking plate may be formed in a disk shape, the light reflection device may further include a mounting part configured to fix the first reflector, the second reflector, the blocking plate, and the motor, which are coupled by the coupling part, to an object to be mounted, and input or output the optical signal only for a predetermined angle range, and the mounting part may include a wall member formed in a curved shape to correspond to an outer circumferential surface of the blocking plate and provided with a sidewall, which vertically extends, to surround one side portions of the first reflector, the second reflector, and the blocking plate coupled by the coupling part, a shielding member that is a plate material disposed parallel to the ground, is provided with a curved groove corresponding to the outer circumferential surface of the blocking plate protruding from the wall member, and is disposed to be engaged with the blocking plate, and a plate member disposed on or under the wall member and to which the motor is fixed.

The plate member may be disposed on the wall member, and the motor may be disposed in a form of hanging the ground on one surface of the plate member.

A magnet may be installed at one side of the motor, and a sensor configured to detect a change in a magnetic field generated from the magnet to sense a rotation angle of the motor may be installed at one side of the plate member.

A protrusion formed to protrude from the sidewall to the outer circumferential surface of the blocking plate by a predetermined length may be provided at a position in the sidewall of the wall member corresponding to the outer circumferential surface of the blocking plate.

According to another aspect of the present disclosure, there is provided a LiDAR scanning system including: a light reflection device including a first reflector configured to reflect an optical signal emitted from a light output unit to an object, a second reflector configured to reflect the optical signal reflected from the object to a light receiving unit, a blocking plate interposed between the first reflector and the second reflector, a motor configured to rotate at least one of the first reflector, the second reflector, and the blocking plate, and a coupling part configured to couple the first reflector, the second reflector, and the blocking plate so that the first reflector, the second reflector, and the blocking plate rotate at the same angle on the basis of a rotation axis; the light output unit configured to emit an optical signal to the light reflection device; and the light receiving unit configured to receive the optical signal reflected from the light reflection device, wherein the optical signal is pulsed laser.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
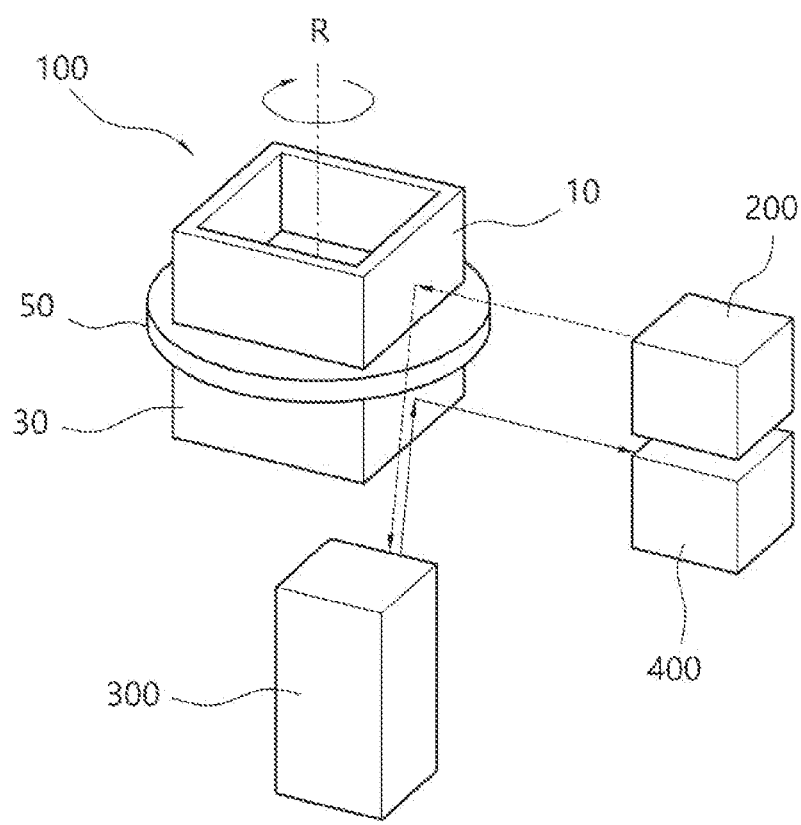
FIG. 1 is a perspective view illustrating a light detection and ranging (LiDAR) scanning system including a light reflection device according to one embodiment of the present disclosure.

Hereinafter, exemplary embodiments of the present disclosure will be described in detail with reference to the accompanying drawings which may allow one of ordinary skill in the art to easily carry out the present disclosure. The present disclosure may be implemented in various forms and is not limited to the following embodiments. Components not related to the description are not included in the drawings to clearly describe the present disclosure, and the same reference symbols are used for the same or similar components in the description.

Terms used in the specification are used solely to describe the particular embodiments and not to limit the present disclosure. The singular form is intended to also include the plural form, unless the context clearly indicates otherwise. It should be further understood that the terms "include," "including," "provide," "providing, "have," and/or "having" specify the presence of stated features, integers, steps, operations, elements, components, and/or groups thereof but do not preclude the presence or addition of one or more other features, integers, steps, operations, elements, components, and/or groups thereof.

Figure 2:
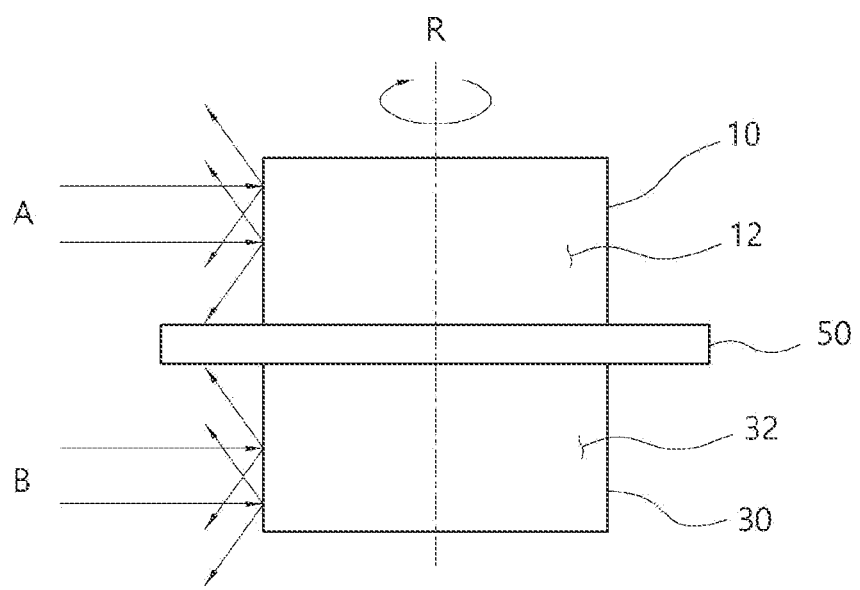
FIG. 2 is a cross-sectional view for describing a function of a blocking plate in the light reflection device according to one embodiment of the present disclosure.
Figure 3:
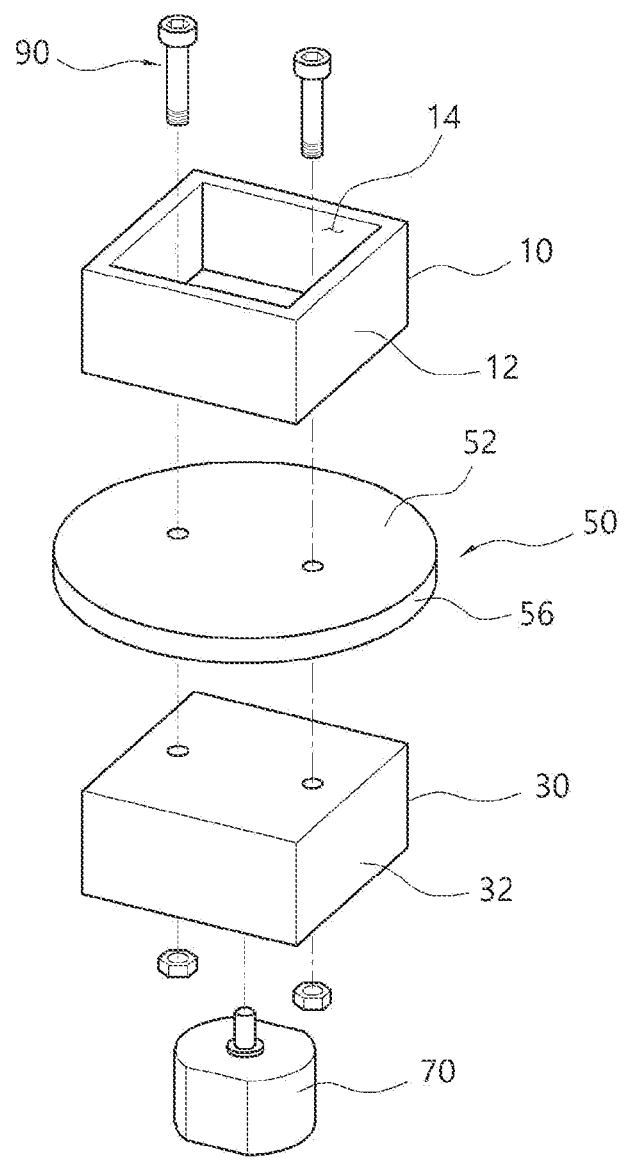
FIG. 3 is an exploded perspective view of the light reflection device according to one embodiment of the present disclosure.

FIG. 1 is a perspective view illustrating a light detection and ranging (LiDAR) scanning system including a light reflection device according to one embodiment of the present disclosure. FIG. 2 is a cross-sectional view for describing a function of a blocking plate in the light reflection device according to one embodiment of the present disclosure. FIG. 3 is an exploded perspective view of the light reflection device according to one embodiment of the present disclosure.

A light reflection device 100 according to one embodiment of the present disclosure a device which senses spatial information of a detection region using laser light.

Specifically, referring to FIG. 1, the light reflection device 100 according to one embodiment of the present disclosure is a device which reflects an optical signal emitted from a light output unit 200 toward an object 300 in the detection region or reflects the optical signal reflected from the object 300 toward a light receiving unit 400.

For example, the light reflection device 100 according to one embodiment of the present disclosure may be used as a device which reflects pulsed laser in a light detection and ranging (LiDAR) scanning device which senses the pulsed laser reflected from the object 300 after emitting the pulsed laser to collect spatial information.

Referring to FIG. 3, the light reflection device 100 according to one embodiment of the present disclosure may include a first reflector 10, a second reflector 30, a blocking plate 50, a motor 70, and a coupling part 90.

In one embodiment of the present disclosure, the first reflector 10 is provided with at least one reflective surface 12, and accordingly, may reflect light emitted from the light output unit 200 to a direction toward the object 300.

In this case, the first reflector 10 may be formed in a polyhedral shape. Especially, all of a plurality of first reflective surfaces 12 through which an optical signal A is incident and reflected may be formed in the same shape. Accordingly, a horizontal cross-section of the first reflector 10 may have a regular polygonal shape. This is because all the plurality of first reflective surfaces 12 should have the same rotation angle when the first reflector 10 is rotated by the motor 70 which will be described later.

More specifically, the first reflector 10 may be provided with the plurality of first reflective surfaces 12. In this case, the first reflector 10 may be rotated with respect to a rotation axis R by the motor 70 to provide another first reflective surface 12 for each predetermined period. Accordingly, the first reflector 10 may reflect the optical signal A toward the object 300 in a wider range beyond a fixed direction, and as a result, a detection range of the spatial information may be expanded.

The first reflector 10 may be formed with a recessed region 14 recessed in a direction from one surface other than the plurality of first reflective surfaces 12 to the rotation axis R. For example, as shown in FIG. 3, the first reflector 10 may be formed in a shape in which an upper surface is omitted from a regular cube or a regular hexagonal column with an empty inside.

That is, the first reflector 10 may be formed of a space member provided with only the plurality of first reflective surfaces 12 which reflect the optical signal A and a bottom surface 16. This may be for easier coupling by the coupling part 90 by reducing a thickness of a coupling part when the first reflector 10 is coupled to the blocking plate 50 and the second reflector 30 which will be described later. Further, it may be for providing a sufficient space when the motor is located in the first reflector 10.

In this case, a hollow through which a shaft 71 of the motor 70 or the coupling part 90 may pass may be formed in a portion of the first reflector 10. Here, a region where the hollow is formed may be the bottom surface 16 of the first reflector 10.

In one embodiment of the present disclosure, the first reflector 10 may be positioned on or under the blocking plate 50 with respect to an axial direction of the rotation axis R. That is, looking at arrangement between the components, the first reflector 10—the blocking plate 50—the second reflector 30 may be disposed in the order in a direction of the rotation axis R.

Further, the first reflector 10 may be located at the same height as the light output unit 200 with respect to the axial direction of the rotation axis R. Accordingly, the optical signal emitted from the light output unit 200 may be deflected toward the first reflector 10 and proceed. Further, since the first reflector 10 and the second reflector 30 are spatially separated from each other, targets of optical signals A and B mainly reflected by the reflectors 10 and 30 may be distinguished from each other. Accordingly, interference between the optical signal A emitted from the light output unit 200 and the optical signal B reflected from the object 300 may be minimized.

Meanwhile, the first reflector 10 may be integrally formed using a plastic injection method. In this case, the first reflector 10 may be formed of a plastic resin that facilitates the reflection of the optical signal. Accordingly, in one embodiment of the present disclosure, manufacturing cost reduction may be achieved. Further, since it is possible to achieve weight reduction of the light reflection device 100, a rotational force by the motor 70 may be efficiently transmitted.

The light reflection device 100 according to one embodiment of the present disclosure may include the second reflector 30 provided with at least one reflective surface 32 like the first reflector 10.

However, since the second reflector 30 has the same or similar shape or function as the first reflector 10, overlapping descriptions are omitted, and the description will focus on a part different from the first reflector 10.

In one embodiment of the present disclosure, the second reflector 30 may reflect the optical signal B, reflected from the object 300 after being reflected from the first reflector 10, toward the light receiving unit 400.

Like the above, a difference between the targets of the optical signals reflected by the second reflector 30 and the first reflector 10 is related to a relative position of the light receiving unit 400.

Specifically, the second reflector 30 may be positioned at the same height as the light receiving unit 400 with respect to the axial direction of the rotation axis R. However, the second reflector 30 may be located at a different height from the light output unit 200 located at the same height as the first reflector 10. Accordingly, the second reflector 30 may play a role in reflecting the light received from the object 300 to be deflected and proceed toward the light receiving unit 400.

In one embodiment of the present disclosure, the second reflector 30 may be formed in the same shape as the first reflector 10. Further, the first reflector 10 and the second reflector 30 may be disposed to achieve plane symmetry based on the blocking plate 50 which will be described later. Accordingly, the first reflective surface 12 and the second reflective surface 32 of the light reflection device 100 may be formed to have the same area.

Like the first reflector 10, the second reflector 30 may be formed with a recessed region 34 recessed in the direction toward the rotation axis R from one surface other than the second reflective surface 32. In this case, the recessed region 34 may be formed to secure a sufficient space for the motor 70 in the second reflector 30.

The light reflection device 100 according to one embodiment of the present disclosure may include the blocking plate 50. In this case, the blocking plate 50 may be interposed between the first reflector 10 and the second reflector 30. As the blocking plate 50 is disposed in this way, interference which may occur by the optical signals A and B being respectively reflected from the reflective surfaces 12 and 32 may be prevented.

In one embodiment of the present disclosure, the blocking plate 50 may be located between the first and second reflectors 10 and 30, but may be coupled by a separate coupling unit, that is, the coupling part 90 which will be described later, to have the same angle as the first and second reflectors 10 and 30 and rotate.

More specifically, referring to FIG. 3, the blocking plate 50 may be formed in a plate shape having a predetermined thickness. That is, the blocking plate 50 may be formed of a plate member including a first surface 52 which comes into contact with the first reflector 10, a second surface 54 which comes into contact with the second reflector 30, and an outer circumferential surface 56.

Like the above, the light reflection device 100 according to one embodiment of the present disclosure may have a structure of the plate-shaped blocking plate 50 which is integrally formed, and thus does not require coupling with the reflective surface in terms of installation. Accordingly, it is possible to prevent damage which may occur on the reflective surfaces 12 and 32 during the installation in comparison with individually installing the blocking plate on a portion of the reflective surface.

In one embodiment of the present disclosure, as shown in the drawings, the blocking plate 50 may be formed in a disk shape. Like the above, since the blocking plate 50 is formed in the disk shape, lengths extending in radial directions from the rotation axis R may be equally formed.

In this case, the first surface 52 and the second surface 54 may be formed to have widths larger than one surface of each of the first reflector 10 and the second reflector 30 which come into contact therewith.

That is, the blocking plate 50 may be formed to extend from the rotation axis in a direction of a rotation radius, and may be formed to partially or entirely protrude from the first reflective surface 12 and the second reflective surface 32. This is because the interference caused by the optical signals A and B between the reflective surfaces 12 and 32 may not be prevented when the blocking plate 50 does not protrude from the first reflective surface 12 and the second reflective surface 32.

It is possible to reduce not only interference caused by the reflected optical signals A and B between the reflective surfaces 12 and 32, but also interference caused by internal scattered light which may occur during a reflection process through the blocking plate 50. Specifically, referring again to FIG. 2, a plurality of inner scattered light rays may be generated during a process of reflecting the optical signals from the first and second reflective surfaces 12 and 32. However, since the above-described blocking plate 50 is disposed between the first and second reflective surfaces 12 and 32, interference between the internal scattered light rays and the optical signals A and B for collecting spatial information may be reduced.

Figure 4:
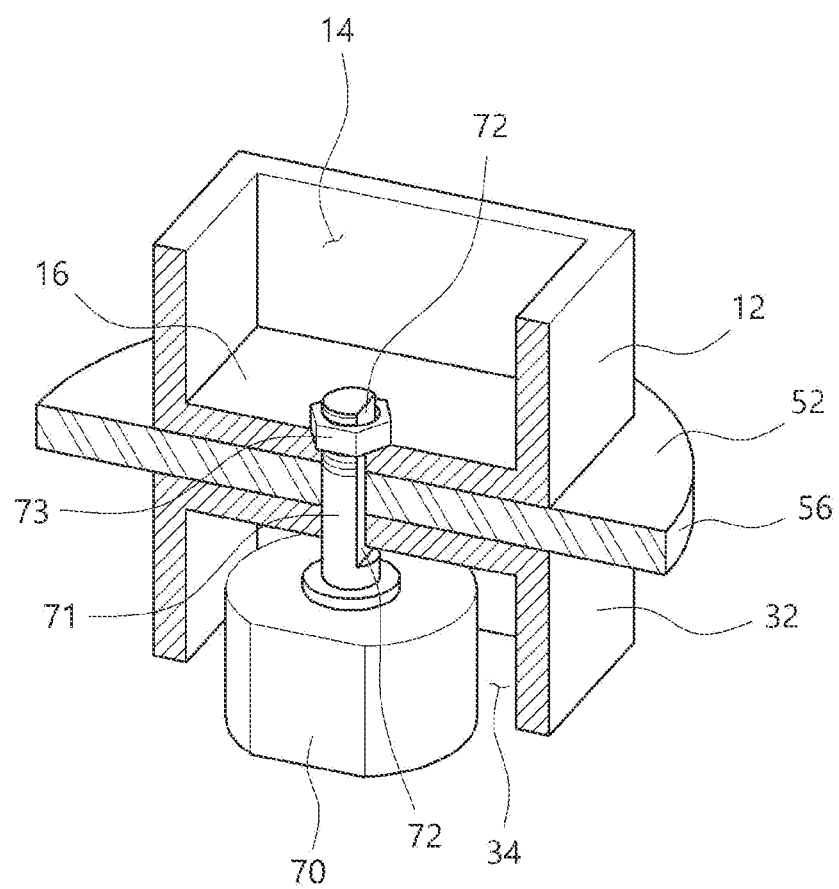
FIG. 4 is a cross-sectional perspective view illustrating a motor connection structure of the light reflection device according to one embodiment of the present disclosure.
Figure 5:
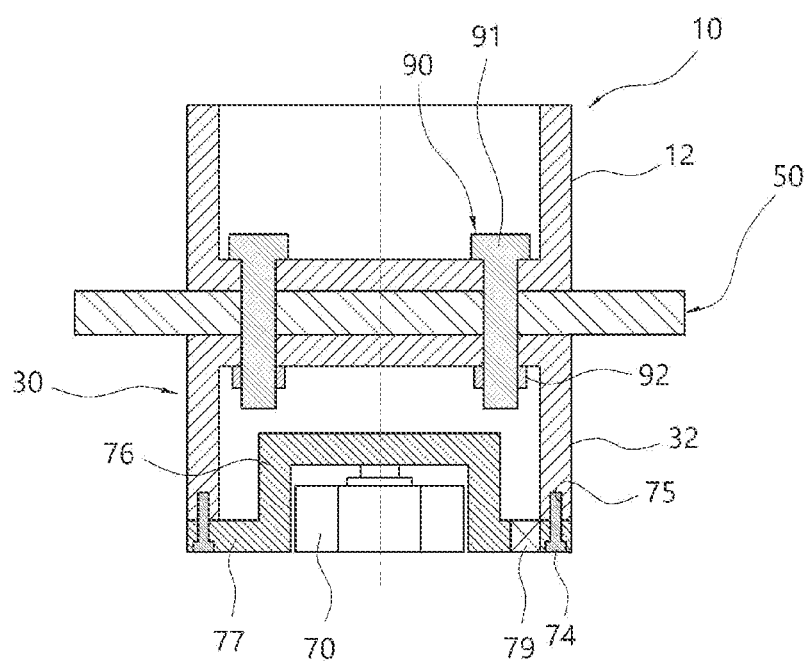
FIG. 5 is a cross-sectional view illustrating a motor connection structure of a light reflection device according to another embodiment of the present disclosure.

FIG. 4 is a cross-sectional perspective view illustrating a motor connection structure of the light reflection device according to one embodiment of the present disclosure. FIG. 5 is a cross-sectional view illustrating a motor connection structure of a light reflection device according to another embodiment of the present disclosure.

The light reflection device 100 according to one embodiment of the present disclosure may be rotated axially based on the rotation axis R by the motor 70.

Specifically, the motor 70 is coupled to at least one of the first reflector 10, the second reflector 30, and the blocking plate 50 to transmit the rotational force to the first reflector 10, the second reflector 30, and the blocking plate 50 as a whole.

For example, referring to FIG. 4, in the motor 70, the axially rotating shaft 71 may transmit the rotational force to the entire light reflection device 100 by passing through all of the first reflector 10, the second reflector 30, and the blocking plate 50 to be coupled to a first nut 73.

In this case, the shaft 71 of the motor 70 may pass through along the rotation axis R. That is, the shaft 71 itself may be the rotation axis R, and may pass through a center of the blocking plate 50.

In one embodiment of the present disclosure, a portion of the shaft 71 of the motor may be formed with a D-cut portion 72.

More specifically, a portion of an outer circumferential surface of the shaft 71 may be solidly coupled to the first reflector 10, the second reflector 30, and the blocking plate 50 by including a vertical plane having a shape cut in a direction parallel to the rotation axis R.

Further, since the shaft 71 is formed with the D-cut portion 72 capable of preventing slipping upon rotation in comparison with an entirely cylindrical shaft, the first reflector 10, the second reflector 30, and the blocking plate 50 may rotate at the same angle.

In this case, the first reflector 10, the second reflector 30, and the blocking plate 50 may be solidly coupled by each including a through hole corresponding to a horizontal cross-section of the shaft 71 including the D-cut portion 72. Like the above, in the case in which the first reflector 10, the second reflector 30, and the blocking plate 50 are coupled through the shaft 71 of the motor 70, during driving of the light reflection device 100, even when one of the first reflector 10 and the second reflector 30 is deviated by a predetermined angle compared to initial mounting, the other reflector 10 or 30 and the blocking plate 50 are also deviated by the same angle. Accordingly, when correcting an error due to deviation, since the first reflector 10 and the second reflector 30 may be corrected by applying the same angle, there is an advantage in that error correction is easy.

In another embodiment of the present disclosure, a motor 70 may be connected to a reflective surface 12 or 32 of a first reflector 10 or a second reflector 30 to rotate the first and second reflectors 10 and 30.

Referring to FIG. 5, at least a portion of the outer circumferential surface of the motor 70 adjacent to the reflective surfaces 12 and 32 may be coupled and connected to the first reflective surface 12 or the second reflective surface 32 through a first bolt 74. In this case, the reflective surface 12 or 32 of the first reflector 10 or the second reflector 30 may accommodate the first bolt 74 by including a groove portion 75 extending in a direction parallel to a rotation axis R.

Like the above, a method of fixing and coupling the motor to the reflective surface 12 or 32 may be used when an outer rotor-type motor is mounted. This is for transmitting a rotational force more efficiently in consideration of the characteristics of the outer rotor type-motor in which an outer circumferential portion of the motor rotates unlike an inner rotor-type motor in which a shaft 71 corresponding to a rotation axis is disposed in a center portion of the motor. Alternatively, like the above, the method of fixing and coupling the motor to the reflective surface 12 or 32 has an advantage compared to a method of coupling the motor using the shaft 71 of the above-described motor 70. Specifically, when the motor is coupled using the shaft 71 of the motor 70, a separate shaft fixing mechanism or a bearing for fixing the shaft 71 is required to prevent the shaft 71 from tilting, but the method of fixing and coupling the motor to the reflective surface 12 or 32 has an advantage in that the shaft fixing mechanism and the bearing may be omitted.

In this case, the motor 70 may be coupled to the first or second reflector 10 or 30 through a motor housing 76 surrounding the main components of the motor 70. To this end, a protruding portion 77 protruding in a radial direction of rotation may be formed on at least a portion of the motor housing 76 adjacent to the first or second reflective surface 12 or 32. Herein, at least a portion of the outer circumferential surface of the motor 70 adjacent to the reflective surfaces 12 and 32 may be directly coupled and connected to the motor housing 76. Otherwise, at least a portion protruding in an axial direction of the rotation axis R from the motor 70 may be directly coupled and connected to the motor housing 76.

In this case, a space for embedding a sensor which senses rotation may be formed in the protruding portion 77 of the motor housing 76. Accordingly, even when a separate space for mounting a sensor or an apparatus is not formed at the outside the motor 70 or the light reflection device 100, since the motion of the motor may be sensed, the space may be more efficiently used.

Meanwhile, even when the motor housing 76 is not directly connected to the reflective surface, since a bracket (not shown) having a shape corresponding to the above-described protruding portion is installed on the motor housing 76, the motor 70 and the first or second reflective surface 12 or 32 may be connected to each other through the bracket. Accordingly, since the rotational force may be transmitted to the reflector without increasing a volume of the motor housing 76, a compact motor may be designed. In this case, the above-described bracket and the reflective surface 12 or 32 may be coupled by the first bolt 74.

FIGS. 6 to 9 are a cross-sectional view and cross-sectional perspective views illustrating a coupling part of the light reflection device according to one embodiment of the present disclosure.

The light reflection device 100 according to one embodiment of the present disclosure may include the coupling pail 90 which couples the first reflector 10, the second reflector 30, and the blocking plate 50.

In this case, coupling the first reflector 10, the second reflector 30, and the blocking plate 50 to each other may refer to the rotation of the first reflector 10, the second reflector 30, and the blocking plate 50 at the same angle on the basis of the rotation axis by the above-described motor.

Figure 6:
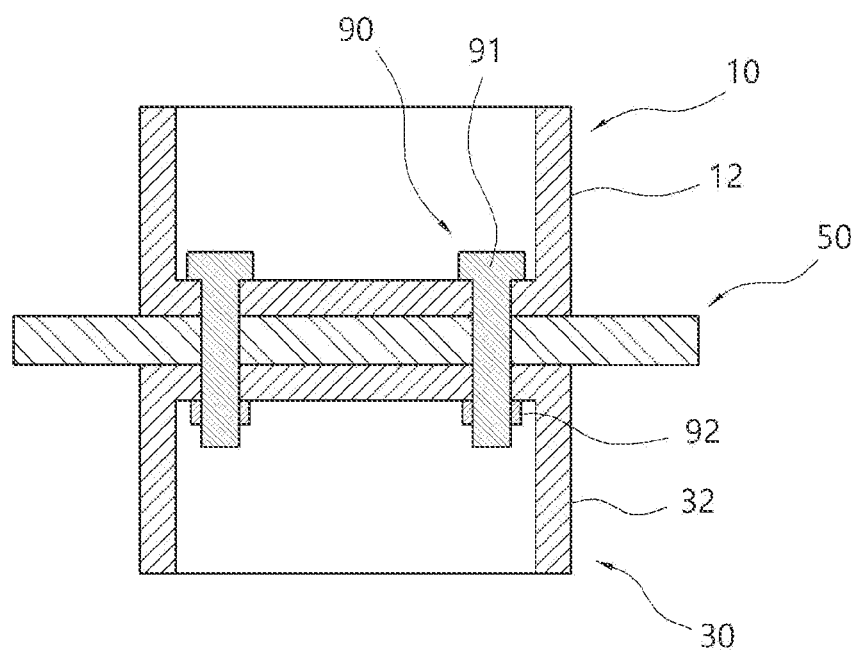
FIGS. 6 to 9 are a cross-sectional view and cross-sectional perspective views illustrating a coupling part of the light reflection device according to one embodiment of the present disclosure.
Figure 7:
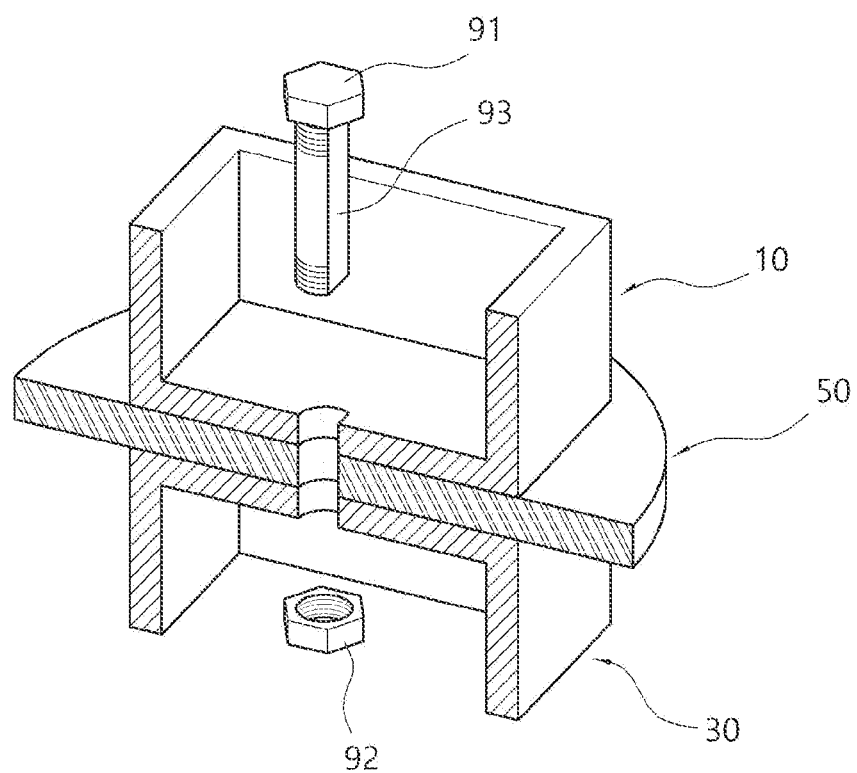

In one embodiment of the present disclosure, referring to FIG. 6, the coupling part 90 may include a second bolt 91 passing through the first reflector 10, the second reflector 30, and the blocking plate 50 and a second nut 92 which may be fastened to the second bolt 91. In this case, there may be at least two pairs of the second bolt 91 and the second nut 92 corresponding to the second bolt 91. Like the above, the first reflector 10, the second reflector 30, and the blocking plate 50 may be solidly coupled through bolt-nut coupling, and thus may always rotate with the same rotation angle.

In this case, like the above-described shaft 71 of the motor 70, the second bolt 91 may include a D cut part 93 on at least a portion of an outer periphery. Accordingly, the first reflector 10, the second reflector 30, and the blocking plate 50 may achieve more solid coupling.

Through this solid coupling, it is possible to prevent the reflector 10 or 30 from slipping with respect to the blocking plate 50. Accordingly, it is possible to prevent an error in optical signal analysis which may occur due to an angular distortion of one of the first reflector 10 and the second reflector 30 with respect to the other reflector in comparison with initial coupling.

Figure 8:
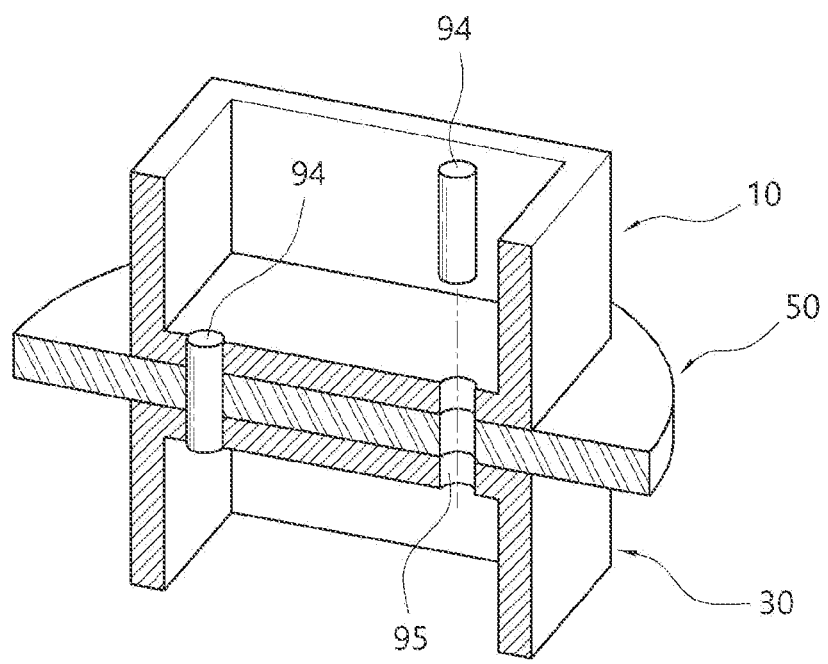

Meanwhile, referring to FIG. 8, the coupling part 90 may include pin members 94 coupled to first through holes 95 passing through the first reflector 10, the second reflector 30, and the blocking plate 50. In this case, since a diameter of the pin members 94 may be formed to be the same as or finely larger than the first through holes 95, forced fit-coupling may be formed between the pin members 94 and the first through holes 95. Accordingly, in comparison with the second bolt 91 and the second nut 92, which require a fastening operation, process efficiency may, be achieved.

Figure 9:
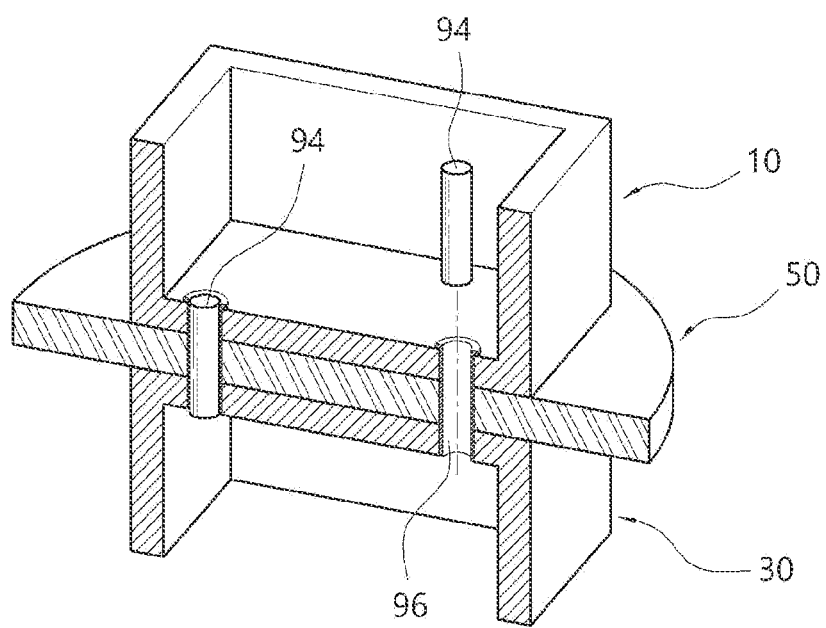

Referring to FIG. 9, in one embodiment of the present disclosure, bushings 96 may be provided between the first through holes 95 and the pin members 94.

In this case, since the bushing 96 is formed of a material having elasticity, easier work may be achieved when the pin members 94 are press-fitted, and the pin members 94 may be maintained without being separated through an elastic force of the bushings 96 even after the pin members 94 are press-fitted. Further, when the bushings 96 are included, the first reflector 10, the second reflector 30, and the blocking plate 50 may be protected from damage during press-fitting.

However, it should be noted that the coupling part 90 is not limited to the second bolt 91 and the pin members 94 which are described above. That is, the coupling part 90 may be implemented through various fastening members which maintain the same rotation angle of the first reflector 10, the second reflector 30, and the blocking plate 50 in addition to the bolt and the bushing.

Figure 10:
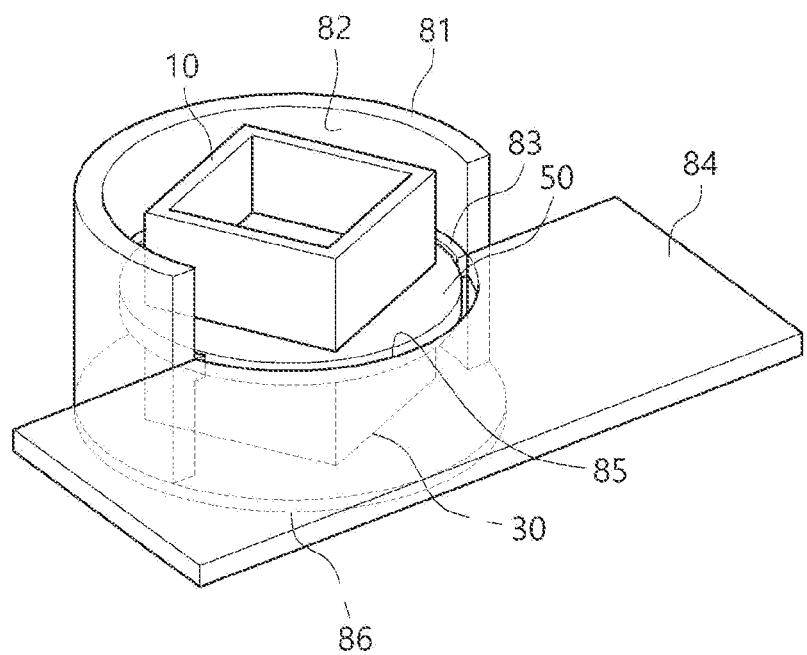
FIG. 10 is a perspective view illustrating a state in which a mounting part among the light reflection device according to one embodiment of the present disclosure is included.
Figure 11:
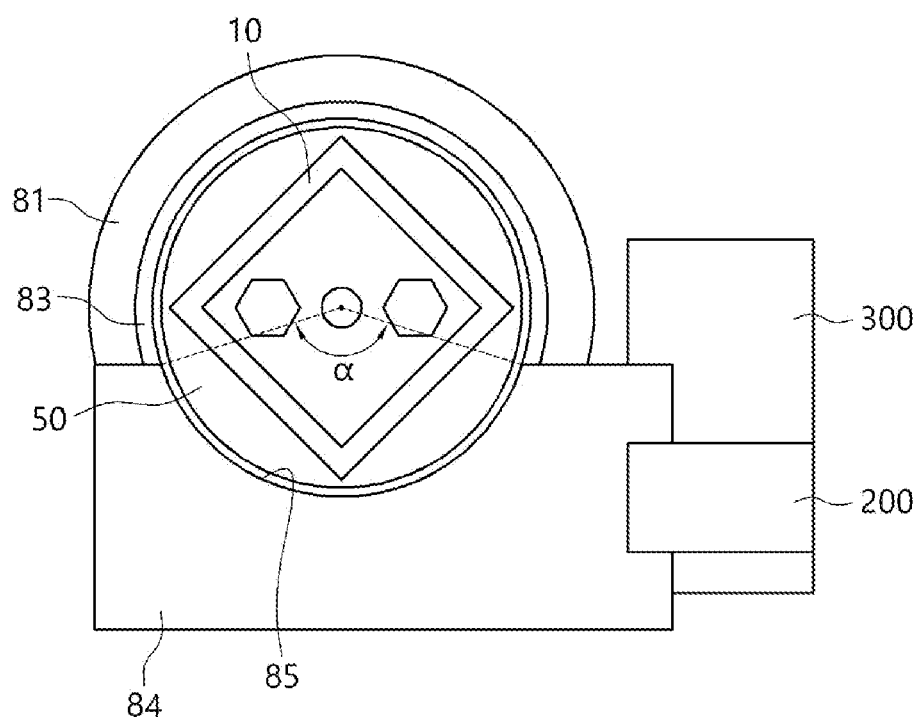
FIG. 11 is a plan view in which the light reflection device shown in FIG. 10 is viewed from above.
Figure 12:
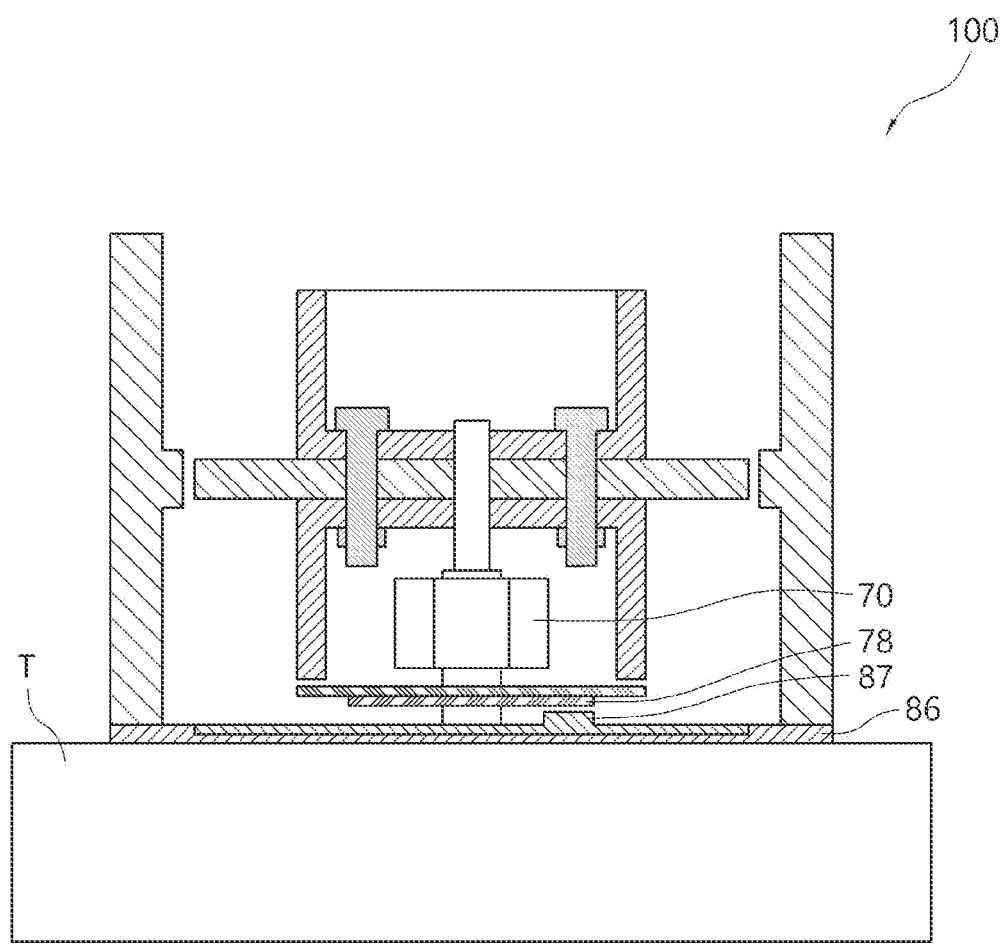
FIGS. 12 and 13 are cross-sectional views illustrating a cross-section of the light reflection device shown in FIG. 10 by dividing the cross-section according a disposing position of the motor.
Figure 13:
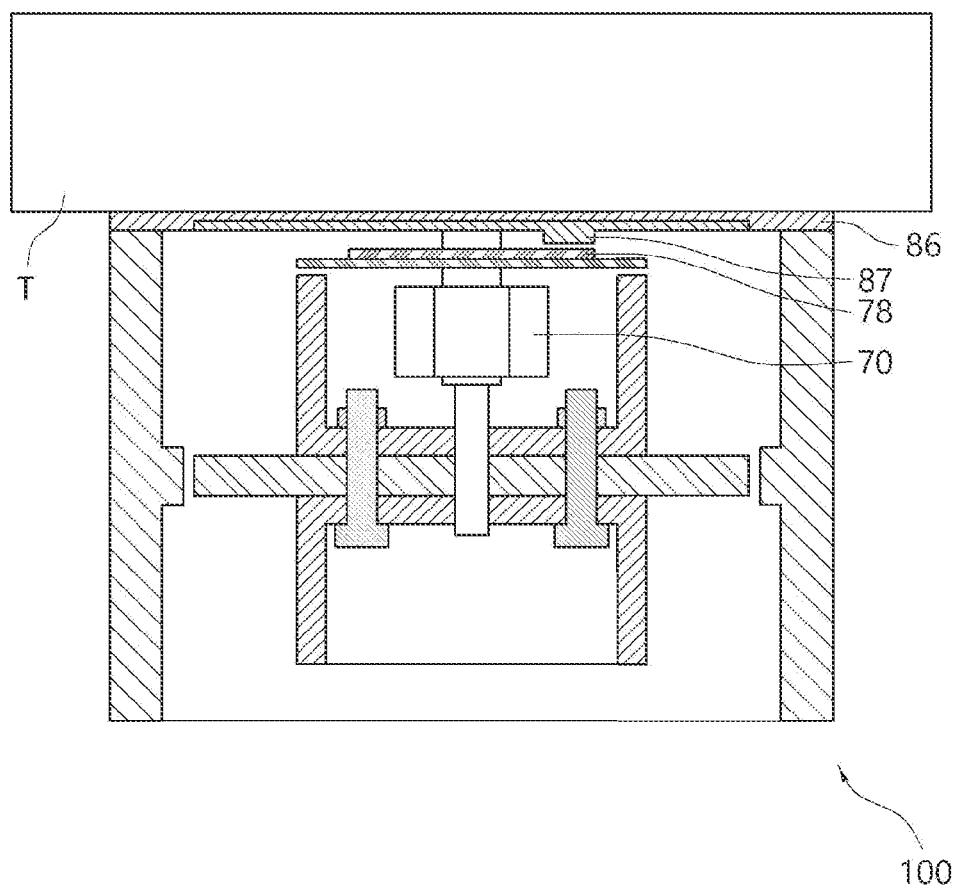

FIG. 10 is a perspective view illustrating a state in which a mounting part among the light reflection device according to one embodiment of the present disclosure is included. FIG. 11 is a plan view in which the light reflection device shown in FIG. 10 is viewed from above. FIGS. 12 and 13 are cross-sectional views illustrating a cross-section of the light reflection device shown in FIG. 10 by dividing the cross-section according a disposing position of the motor.

Referring to FIGS. 10-13, the light reflection device 100 according to one embodiment of the present disclosure may further include a mounting part 80 which fixes the first reflector 10, the second reflector 30, the blocking plate 50, and the motor 70, which are coupled by the coupling part 90, to an object to be mounted T such as a vehicle or the like and to input or output an optical signal only for a predetermined angle range α.

Specifically, the mounting part 80 may include a wall member 81, a shielding member 84, and a plate member 86.

First, the wall member 81 is formed in a curved shape to correspond to an outer circumferential surface of the blocking plate 50, and as shown in FIG. 10, may be formed in a shape in which a portion of a cylinder formed with a hollow therein is divided. That is, the wall member 81 may be formed in a shape in which a curved sidewall 82 corresponding to the outer circumferential surface of the blocking plate 50 vertically extends. Like the above, the wall member 81 surrounds one side of each of the first reflector 10 and the second reflector 30 through the sidewall 82, but exposes the other side to the outside so that the optical signal may be restricted to be input or output only for the predetermined angle range α as shown in FIG. 11.

In the embodiment of the present disclosure, referring to FIGS. 10 and 11, a protrusion 83 formed to protrude from the sidewall 82 to the outer circumferential surface of the blocking plate by a predetermined length may be provided at a position in the sidewall 82 of the wall member 81 corresponding to the outer circumferential surface of the blocking plate 50. Here, when the first reflector 10, the second reflector 30, the blocking plate 50, and the motor 70 in the coupled state by the coupling part 90 are initially fixed to the mounting part 80, the protrusion 83 may function as a reference for determining whether the blocking plate 50 is disposed parallel to the ground. Further, the protrusion 83 may function as a reference for correcting the rotation axis R when the rotation axis is gradually inclined according to the rotation of the motor 70. In addition, since the protrusion 83 provides an allowable length in which the shielding member 84 and the wall member 81 may be engaged with each other when the shielding member 84 to be described later is fixed to the wall member 81, there is an advantage in that manufacturing tolerance of the shielding member 84 may be compensated for.

Next, the mounting part 80 may include the shielding member 84 which is a plate material disposed parallel to the ground. In this case, as shown in FIG. 11, the shielding member 84 may be provided with a curved groove 85 corresponding to the outer circumferential surface of the blocking plate 50 protruding from the above-described wall member 81, and thus may be disposed in a shape engaged with the blocking plate 50. Accordingly, the shielding member 84 may constitute a plane extending from the blocking plate 50, and thus may perform a function of reducing interference caused by the reflected optical signals A and B between the reflective surfaces 12 and 32 and interference caused by internal scattered light which may be generated during a reflection process like the blocking plate 50.

Further, the mounting part 80 may include the plate member 86 as a plate material disposed on or under the wall member 81 to form a floor surface or a ceiling surface. In this case, as shown in FIGS. 12 and 13, the motor 70 may be fixed to an upper surface of the plate member 86.

In this case, the motor 70 may be fixed in a shape of being seated on the plate member 86 forming the floor surface of the wall member 81 as shown in FIG. 12, and may also be fixed in a shape of hanging on the plate member 86 forming the ceiling surface of the wall member 81 as shown in FIG. 13. Like the above, when the motor 70 is disposed in a hanging form on the plate member 86, since the rotation axis R of the motor 70 always maintains a vertical direction due to gravity, there is an advantage in that tilting of the rotation axis R according to the rotation of the motor 70 may be prevented.

Meanwhile, as shown in FIGS. 12 and 13, a magnet 78 which generates a magnetic field may be installed at one side of the motor, and a sensor 87 which detects a change in the magnetic field generated from the magnet 78 of the motor 70 may be installed at one side of the plate member 86 in response thereto. In this case, as the sensor, a Hall sensor capable of detecting the change in the magnetic field may be used. Accordingly, the light reflection device 100 according to one embodiment of the present disclosure may sense the rotation angle of the motor 70.

As described above, the light reflection device 100 according to one embodiment of the present disclosure may prevent damage which may occur on the reflective surface by introducing an independent plate-shaped blocking plate 50 in comparison with a case in which the blocking plate is directly installed on the reflective surface. Accordingly, reliability of the collected optical signal may be enhanced.

Further, since the first reflector 10, the second reflector 30, and the blocking plate 50 are separately manufactured, simple and solid coupling may be performed through the coupling portion 90 while achieving process efficiency. Through this solid coupling, an error in optical signal analysis which may occur due to misalignment of the first reflective surface 12 and the second reflective surface 32 may be prevented in advance.

Meanwhile, since various coupling structures according to a type of motor are provided, the rotational force may be easily transmitted, and a compact light reflection device may be designed.

According to one embodiment of the present disclosure, since an independent plate-shaped blocking plate is adopted, it is possible to prevent interference due to reflected optical signals, while preventing damage which can occur on the reflective surface during installation.

According to one embodiment of the present disclosure, since a plurality of reflectors and blocking plates are separately manufactured, process efficiency can be achieved, while a solid coupling can be achieved through a unique coupling part.

According to one embodiment of the present disclosure, since various coupling structures according to a type of motor are provided, it is possible to easily transmit a rotational force by design.

Although embodiments of the present disclosure have been described above, the spirit of the present disclosure is not limited to the embodiments shown in the description, and although those skilled in the art may provide other embodiments through the addition, change, or removal of the components within the scope of the same spirit of the present disclosure, such embodiments are also included in the scope of the spirit of the present disclosure.

What is claimed is:

1. A light reflection device comprising:
a first reflector configured to reflect an optical signal emitted from a light output unit to an object;
a second reflector configured to reflect the optical signal reflected from the object to a light receiving unit;
a blocking plate interposed between the first reflector and the second reflector;
a motor configured to rotate at least one of the first reflector, the second reflector, and the blocking plate; and
a coupling part configured to couple the first reflector, the second reflector, and the blocking plate so that the first reflector, the second reflector, and the blocking plate rotate at the same angle on the basis of a rotation axis,
wherein the blocking plate includes a first surface and a second surface, which are opposite sides of the blocking plate,
the first reflector is located on the first surface of the blocking plate, and
the second reflector is located on the second surface of the blocking plate, and
wherein the coupling part passes through the first reflector, the second reflector, and the blocking plate.

2. The light reflection device of claim 1, wherein at least one of the first reflector and the second reflector is formed in a polyhedral shape, and is formed with a recessed region recessed in a direction from one surface to the rotation axis.

3. The light reflection device of claim 1, wherein the first reflector and the second reflector are formed in the same shape.

4. The light reflection device of claim 1, wherein the blocking plate is formed in a disk shape.

5. The light reflection device of claim 1, wherein the coupling part includes a shaft of the motor passing through the first reflector, the second reflector, and the blocking plate, and a first nut coupled to the shaft.

6. The light reflection device of claim 5, wherein the shaft is formed with a D-cut portion in at least a portion thereof.

7. The light reflection device of claim 1, wherein the motor is connected to a reflective surface of the first reflector or the second reflector to rotate the first reflector or the second reflector.

8. The light reflection device of claim 7, wherein the motor is an outer rotor-type motor.

9. The light reflection device of claim 7, wherein a protruding portion is formed on at least a portion, adjacent to the reflective surface of the first reflector or the second reflector, of a housing of the motor.

10. The light reflection device of claim 9, wherein a sensor configured to sense rotation is installed in the protruding portion.

11. The light reflection device of claim 7, wherein a portion of a housing of the motor and the reflective surface of the first reflector or the second reflector are coupled to each other using a first bolt.

12. The light reflection device of claim 1, wherein the coupling part includes a second bolt passing through the first reflector, the second reflector, and the blocking plate, and a second nut coupled to the second bolt.

13. The light reflection device of claim 12, wherein the second bolt is formed with a D-cut portion in at least a portion thereof.

14. The light reflection device of claim 1, wherein the coupling part includes pin members forcibly fit-coupled to a through hole passing through the first reflector, the second reflector, and the blocking plate.

15. The light reflection device of claim 1, wherein:
the blocking plate is formed in a disk shape;
the light reflection device further includes a mounting part configured to fix the first reflector, the second reflector, the blocking plate, and the motor, which are coupled by the coupling part, to an object to be mounted, and input or output the optical signal only for a predetermined angle range; and
the mounting part includes a wall member formed in a curved shape to correspond to an outer circumferential surface of the blocking plate and provided with a sidewall, which vertically extends, to surround one side portions of the first reflector, the second reflector, and the blocking plate coupled by the coupling part, a shielding member that is a plate material disposed parallel to the ground, is provided with a curved groove corresponding to the outer circumferential surface of the blocking plate protruding from the wall member, and is disposed to be engaged with the blocking plate, and a plate member disposed on or under the wall member and to which the motor is fixed.

16. The light reflection device of claim 15, wherein:
the plate member is disposed on the wall member; and
the motor is disposed in a form of hanging the ground on one surface of the plate member.

17. The light reflection device of claim 15, wherein:
a magnet is installed at one side of the motor; and
a sensor configured to detect a change in a magnetic field generated from the magnet to sense a rotation angle of the motor is installed at one side of the plate member.

18. The light reflection device of claim 15, wherein a protrusion formed to protrude from the sidewall to the outer circumferential surface of the blocking plate by a predetermined length is provided at a position in the sidewall of the wall member corresponding to the outer circumferential surface of the blocking plate.

19. A light detection and ranging (LiDAR) scanning system comprising:
a light reflection device including a first reflector configured to reflect an optical signal emitted from a light output unit to an object, a second reflector configured to reflect the optical signal reflected from the object to a light receiving unit, a blocking plate interposed between the first reflector and the second reflector, a motor configured to rotate at least one of the first reflector, the second reflector, and the blocking plate, and a coupling part configured to couple the first reflector, the second reflector, and the blocking plate so that the first reflector, the second reflector, and the blocking plate rotate at the same angle on the basis of a rotation axis,
wherein the blocking plate includes a first surface and a second surface, which are opposite sides of the blocking plate, the first reflector is located on the first surface of the blocking plate, and the second reflector is located on the second surface of the blocking plate, and
the coupling part passes through the first reflector, the second reflector, and the blocking plate;
the light output unit configured to emit the optical signal to the light reflection device; and
the light receiving unit configured to receive the optical signal reflected from the light reflection device,
wherein the optical signal is pulsed laser.

* * * * *

UNITED STATES PATENT AND TRADEMARK OFFICE
CERTIFICATE OF CORRECTION

| | | |
|---|---|---|
| PATENT NO. | : 12,326,517 B2 | Page 1 of 1 |
| APPLICATION NO. | : 17/173191 | |
| DATED | : June 10, 2025 | |
| INVENTOR(S) | : HakGu Han et al. | |

It is certified that error appears in the above-identified patent and that said Letters Patent is hereby corrected as shown below:

In the Specification

On Column 1, Line 11, before the "BACKGROUND", please insert the following paragraph:
-- [Project Identification Number] 2410012812
[Project Number] 20014592
[Ministry] Ministry of Trade, Industry and Energy
[Project Management (Specialized) Organization] Korea Planning & Evaluation Institute of Industrial Technology
[Name of Research Program] Autonomous Driving Technology Development and Innovation Program (R&D)
[Research Project] Development of High-Resolution 3D Solid-State LiDAR for Autonomous Driving
[Name of Project Executing Organization] HL Klemove Corp.
[Research Period] April 1, 2021 to December 31, 2025 --

Signed and Sealed this
Thirteenth Day of January, 2026

John A. Squires
*Director of the United States Patent and Trademark Office*